Aug. 10, 1954  L. E. SOLDAN  2,685,850
ATTACHMENT FOR VEHICLES
Filed May 16, 1951  2 Sheets-Sheet 1
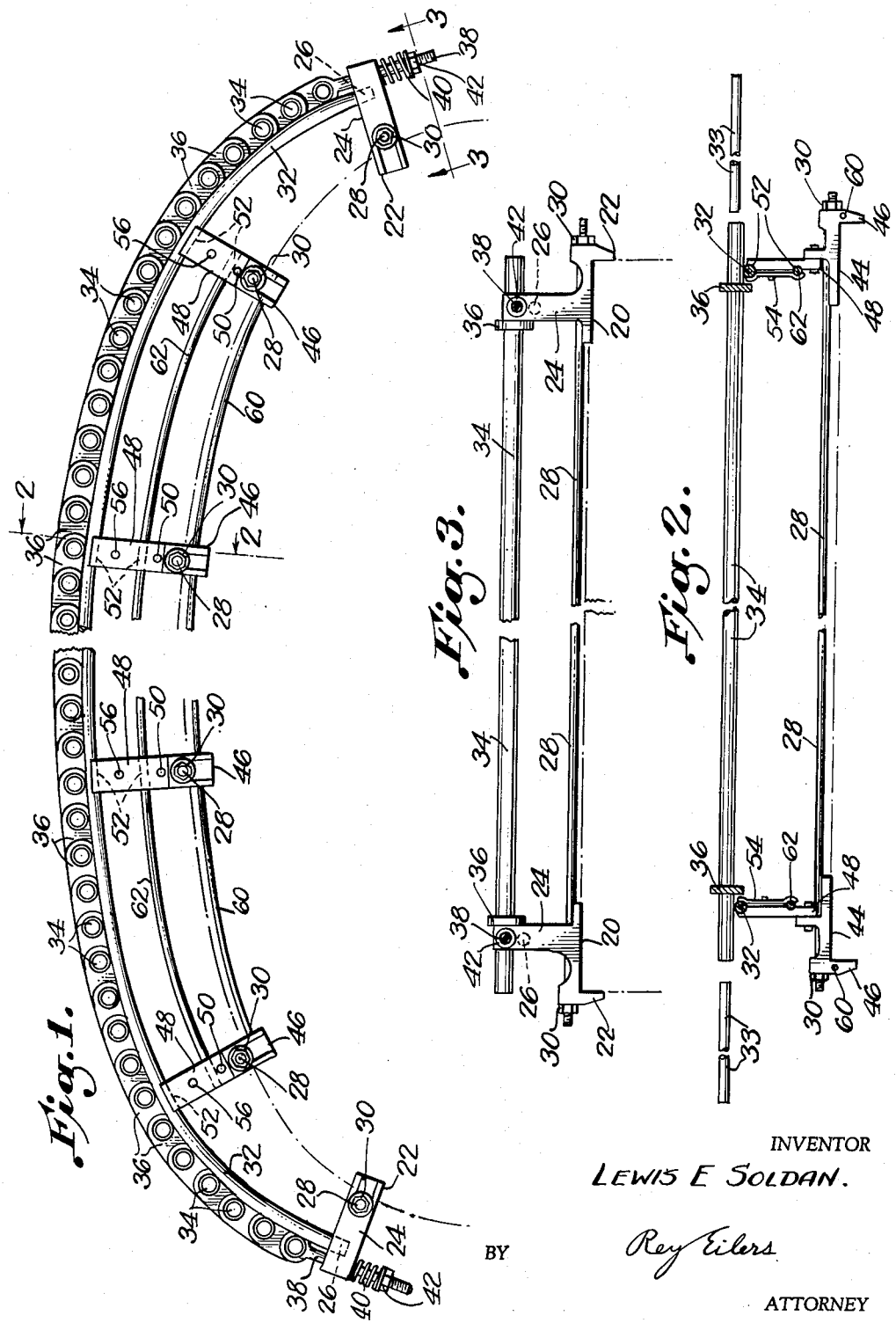
INVENTOR
LEWIS E. SOLDAN.
BY Rey Eilers
ATTORNEY

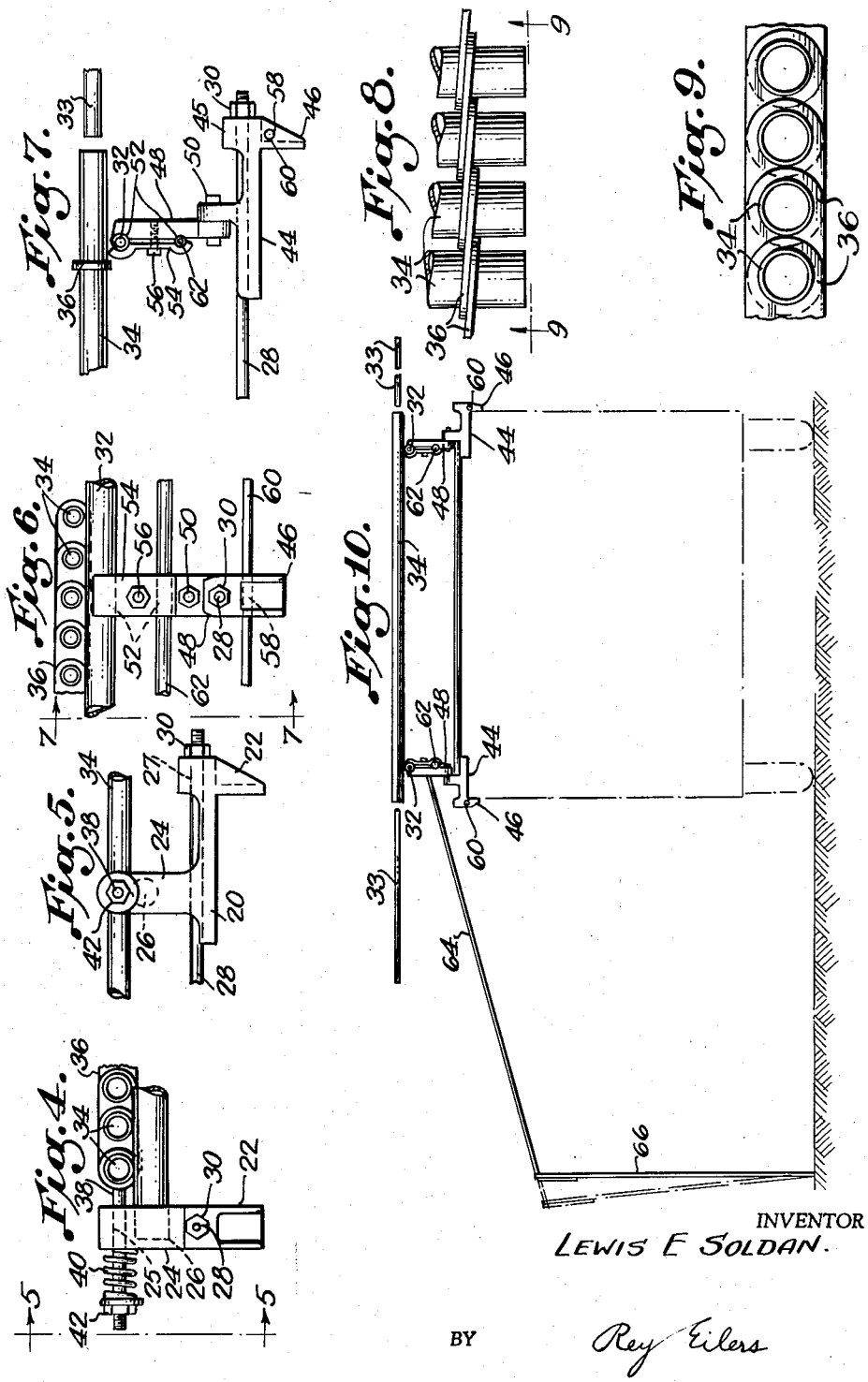

Patented Aug. 10, 1954

2,685,850

UNITED STATES PATENT OFFICE 2,685,850

ATTACHMENT FOR VEHICLES

Lewis E. Soldan, San Diego, Calif.

Application May 16, 1951, Serial No. 226,613

13 Claims. (Cl. 108—3)

This invention relates to improvements in attachments for vehicles. More particularly this invention relates to improvements in attachments for vehicles which facilitate the cooling of such vehicles.

It is therefore an object of the present invention to provide an improved attachment for vehicles which will facilitate the cooling of such vehicles.

It has been found that where vehicles are exposed to the rays of the sun for considerable periods of time, the vehicles and the air within them become quite warm. This is objectionable where the vehicles are trailers in which people live. The trailers are customarily built with considerable insulating material immediately under the roof, and the trailers are made so the roofs thereof tend to reflect the rays of the sun. Despite all of these precautions, the vehicles do become quite warm when exposed to the rays of the sun for considerable periods.

The present invention reduces the heating of vehicles by providing a cover that overlies and is spaced above the top of the vehicle. This cover reflects many of the rays of the sun and it permits air to pass between the top of the vehicle and the bottom of the cover to carry away and dissipate much of the heat which is absorbed by the cover from the rays of the sun. In addition, the cover is provided with slots through which hot air can escape and thus prevent the accumulation of hot air immediately adjacent the top of the vehicle. This cover has been found to materially reduce the temperature of vehicles with which it is used. It is therefore an object of the present invention to provide a cover for vehicles which can be disposed above the tops of such vehicles to reflect many of the rays of sun and which has slots therein to permit hot air to escape from the vicinity of the tops of the vehicles.

Vehicles are frequently moved at high speeds, and therefore this cover must be able to withstand the forces of the air through which the cover is moved at high speeds. The present invention provides such a cover by making it from a number of elongated elements which are linked together and which are securely held to brackets atop the vehicle. The elongated elements will be rigid and will not flap or tear loose as the vehicle moves along. It is therefore an object of the present invention to provide a cover for vehicles which include a number of elongated elements which are linked together.

The elongated elements of the cover provided by the present invention are supported by curved rods which in turn are supported by brackets. The elongated elements are readily assembled with the brackets and curved rods by laying those elongated elements on the curved rods and then pulling those elements along the rods until they are in position. This is very desirable because it facilitates the ready installation or removal of the cover atop the vehicle. It is therefore an object of the present invention to provide a cover which is supported by curved rods which in turn are supported by brackets atop the vehicles.

The elongated elements provided in the cover for the vehicle are preferably hollow. Such elements can then receive rods which can be telescoped out of either end of the elements to provide shade for the opposite sides of the vehicle. The rods and the elements will provide shade for the greater portion of the vehicle exposed to the direct rays of the sun. In doing so, these rods and elements will greatly reduce the overall heating of the vehicle. It is therefore an object of the present invention to provide a cover which includes elongated hollow elements and rods or tubes telescoping within such elements.

A cover atop a vehicle which is left in the sun will tend to expand and contract with changes in the position of the sun. The present invention accommodates such expansion and contraction by fastening the elongated elements of the cover to the brackets of the cover by yieldable fasteners. These fasteners will hold the elongated elements tightly to the brackets at all times, but will yield to accommodate expansion and contraction.

The brackets which support the elongated elements provided by the present invention also carry awning rails. One of these awning rails is located closely adjacent the top edge of the roof of the vehicle, while the other of such rails is spaced a distance above that top edge. In cold weather the awning can be hooked to the lower of the two rails and will trap warm air between the side of the vehicle and itself. In warm weather, the awning can be hooked to the upper of the rails and will then conduct hot air away from the side of the vehicle and vent it above the top of the vehicle.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing Fig. 1 is a broken side elevational view of the cover and brackets provided by the present invention, Fig. 2 is a broken end elevational view of the cover and brackets provided by the present invention, and it is taken along the plane indicated by the line 2—2 in Fig. 1, Fig. 3 is an end elevational view of the cover and brackets provided by the present invention, and it is taken along the plane denoted by the line 3—3 in Fig. 1, Fig. 4 is a larger view of a part of the cover and one of the brackets shown in Figs. 1 and 3, Fig. 5 is an end elevational view of the portion of the cover and the bracket shown in Fig. 4, and is taken along the plane indicated by the line 5—5 in Fig. 4, Fig. 6 is a side elevational view of a portion of the cover and one of the brackets shown in Figs. 1 and 2, Fig. 7 is an end elevational view of the portion of the cover and bracket shown in Fig. 6, and it is taken along the plane indicated by the line 7—7 in Fig. 6, Fig. 8 is a plan view of a portion of the cover shown in Fig. 1, Fig. 9 is a side elevational view of the portion of the cover shown in Fig. 8, and it is taken along the plane indicated by the line 9—9 in Fig. 8, and Fig. 10 is an end elevational view of the cover and brackets of Figs. 1 and 2 as they are assembled with a vehicle, and it also shows an awning attached to the brackets of Figs. 1 and 2.

Referring to the drawing in detail, the numeral 20 denotes a bracket which has a downwardly depending lug 22 thereon and which has formed thereon an upstanding body portion 24. The downwardly depending lug 22 is spaced outwardly of the upstanding body portion 24. An opening 25 extends through the upper end of the body portion 24, and a recess 26 is formed in that body portion below the opening 25. An opening 27 is formed in the portion of bracket 20 immediately above the depending lug 22.

Four such brackets 20 are provided, and they are spaced adjacent the four corners of the top of the vehicle; usually a trailer. While these brackets could be permanently bolted to the top of the vehicle, it is desirable to mount those brackets so they can be removed. This is done by passing two elongated rods 28 between the brackets 20; one rod 28 extending between each pair of brackets 20. The ends of the elongated rods 28 are threaded, and nuts 30 are threaded onto those ends. Rotation of the nuts 30 will move the brackets 20 toward each other until the depending lugs 22 thereon intimately engage the sides of the vehicle adjacent the top of the vehicle. The nuts 30 can be set so tightly that the brackets 20 are securely and positively held to the top of the vehicle. At such time, the elongated rods 28 will be spaced just a short distance above the top of the vehicle, as indicated in Figs. 2 and 3, wherein the top of the vehicle is indicated by the dashed line.

Two curved rods 32 extend between the brackets 20; the ends of the curved rods 32 extending into and being held by the recesses 26 in those brackets. The curved rods 32 can be welded, brazed or otherwise secured to the brackets 20. The curved rods 32 will coact with the elongated rods 28 to provide rigidity for the frame that includes the brackets, the curved rods 32 and the elongated rods 28.

Each frame supports a plurality of elongated elements 34 in the form of tubes. The tubes are connected together by links 36 which are rounded at the ends and have two circular openings adjacent the ends thereof. These openings telescope over the elongated elements 34 and thus enable the links 36 to maintain the elements 34 in assembled relation while yet permitting rotation of the links 36 around those elongated elements. The elongated elements 34 will preferably be made of bamboo, canvas, slatted wood or lightweight metal. Where desired, rods 33 can be inserted within the elongated elements 34; such rods being able to telescope within or to be pulled part way out of the elements 34. Four links with attached bolts 38 are provided, and those links are at the outermost portions of the cover provided by the present invention. The bolts of such combination links and bolts extend through openings 25 in the upper end of the body portions 24 of brackets 20. Helical springs 40 are telescoped over the ends of the bolts 38 and nuts 42 are threaded onto the ends of those bolts. The nuts 42 will be set so the springs 40 are compressed and bias the links 36 and elongated elements 34 into tight engagement with the curved rods 32. As the curved rods 32 expand and contract with changes in the setting of the sun, the spring 5 will expand and contract to compensate for the expansion and contraction of the curved rods 32. In this way, the elongated elements 34 will always be held tightly against the curved rods 32.

Eight or more brackets 44 are disposed between the brackets 20, and those brackets have depending lugs 46 and upstanding body portions 48. A nut and bolt combination 50 secures the upstanding body portion 48 of the brackets 44 to those brackets. Spaced semi-cylindrical recesses 52 are formed in the body portion 48 of brackets 44 and those recesses coact with recesses in a securing plate 54 to receive and hold the curved rod 32 and an awning rail 62. The nut and bolt combination can be set so tightly that the securing plate and upstanding body lock the curved rod 32 and awning rail tightly in position relative to the brackets 44. The brackets 44 will, themselves, be locked in position relative to the vehicle by elongated rods 28 and nuts 30. The rods 28 will extend through openings 45 in the brackets 44 immediately above the depending lugs 46. A lower awning rail 60 will extend between the brackets 44 and will be held by the openings 58 in the depending lugs 46 of those brackets.

The brackets 44 and the awning rails 60 and 62 will additionally strengthen the frame which includes the brackets 20 and the curved rod 32 and the elongated rods 28 and the nuts 30. This frame could be mounted on the vehicle as a unit, but it will be preferable, in most instances, to mount the four brackets 20 and the curved rods 32 first. Thereafter, the elongated rods 28 and the nuts 30 can be used to hold the four brackets 20 and the curved rods 32 in position. Once this has been done, the securing plates 54 can be separated from the body portions 48 of the brackets 44 and then the brackets 44 set in position. Replacement of the securing plates 54 and tightening of the nut and bolt combination 56 will then lock the brackets 44 to the curved rod 32. The awning rails 62 and 60 can be assembled with the brackets 44 immediately before the nuts and bolts 56 are tightened. By making the frame in this manner, it is possible for one individual to secure that frame to the top of the vehicle without effort or strain.

The elongated elements 34 and the links 36 make a flexible cover which can be rolled up for storage or can be extended as shown in Fig. 1 to overlie and cover the top of the vehicle. To mount this cover atop the frame, it is only necessary to throw a rope over the top of the vehicle and attach one end to one of the elongated elements at the edge of the cover. Pulling on that rope will raise the cover upwardly to the level of the brackets 20 and will enable the elongated elements to slide along the curved rods 32 until the combination bolts and links 38 can be grasped. Thereafter, it is only a matter of telescoping the ends of those combination links and bolts through the openings 25 in the brackets 20 and slipping the springs 40 and nuts 42 over those bolts. Once the one side of the cover has been secured, it is a simple matter to go to the other side of the vehicle and telescope the ends of the combination links and bolts 38 through the openings 25 in the brackets 20. Selective tightening of the nuts 42 will provide the desired tension between the elongated elements 34 and the curved rods 32. The links 36 extend below the surfaces of the elongated elements 34 and will keep the elongated elements 34 from shifting longitudinally of the vehicle as the cover is pulled along the curved rods 32. Thus precise positioning of the elongated elements is assured.

The elongated elements 34 are spaced apart by the links 36, but the spacing between adjacent elements 34 is less than the width of any of those elements. As the result, while the sun which is directly overhead can shine through the space between the elements 34, that sun will not be able to do so when it is inclined to one side or the other of the direct vertical line. The rays of the sun will be intercepted by the adjacent elements 34 and much of it will be reflected. That portion of the rays of the sun which the elements 34 intercept will be unable to cause excessive heating of the vehicle because air can pass between the top of the vehicle and the bottom of the elements 34 and dissipate that heat. Any such heat can easily find its way upwardly through the spaces between the elements 34 and in doing so will cause a cooling circulation of air. In this way, the elements 34 keep the top of the vehicle cool. The sides of the vehicle can be kept cool by drawing the rods 33 part way out of the elements 34. If desired, of course, one long rod 33 could be substituted for the two shorter rods 33. However, for flexibility, two short rods 33 are usually preferred. The short rods will project beyond the sides of the vehicle and will intercept rays that would normally strike the sides of that vehicle. Thus throughout the heat of the day, the top and sides of the vehicle will be shaded. Moreover, the cover will not hold a hot layer of air adjacent the top of the vehicle, but instead will permit that air to pass freely through the slots between the elongated elements 34 and the rods 33. If desired, a number of the rods 33 could be attached together at their ends to facilitate the telescoping movement of those rods outwardly from the elements 34. However, it would be practical to connect only half a dozen or so of such tubes together.

An awning 64 of canvas or other material can have its inner end hooked to the awning rail 60 or the awning rail 62. The outer ends of the awning 64 will be supported in usual manner by the poles 66. When the inner ends of the awnings are secured to the awning rail 60, the awning will coact with the side of the vehicle to entrap warm air. This is desirable in cool weather. When the inner ends of the awnings 64 are hooked to the awning rails 62, there will be a space above the top of the vehicle and below the awning 64 through which heated air can flow. This air will then pass through the spaces between the elongated elements 34 and be dissipated. Thus there will be a movement of air up along the sides of the trailer and out across the top of the trailer which will tend to additionally cool the trailer.

The elongated elements 34 can be left in position atop the vehicle as the vehicle is moved or they can be removed. Similarly, the frame consisting of the brackets 20 and 44, the curved rods 32, the awning rails 60 and 62, and elongated rods 28 and nuts 30 can also be left in position atop the vehicle or can be removed. It will usually be found preferable to leave the frame atop the vehicle even if the cover is removed because that frame will act to protect the chimney and other portions of the vehicle at the top thereof.

Whereas the drawing and accompanying description have shown and described a preferred embodiment of the present invention it should be apparent to those skilled in the art that various changes may be made in the form of the invention without affecting the scope thereof.

What I claim is:

1. An attachment for a vehicle that comprises a pair of spaced apart elongated supports, spacers that are secured to said supports and are securable to the upper part of said vehicle to hold said supports above said upper part of said vehicle, the lower ends of said spacers defining a surface that is complementary to said upper part of said vehicle, and a plurality of elongated shielding elements that are held above said upper part of said vehicle by said supports to define an air space between said surface and said shielding elements, said shielding elements extending transversely of said supports and being spaced apart longitudinally of said supports to define air spaces therebetween, said spacers having open areas therebetween to permit air to pass between said upper part of said vehicle and said shielding elements preparatory to escaping through said air spaces between said shielding elements, said shielding elements substantially shielding said surface from the rays of the sun.

2. An attachment for a vehicle as claimed in claim 1 wherein spacing elements extend between said shielding elements and hold them in assembled relation while permitting said shielding elements to be spaced apart longitudinally of said supports.

3. An attachment for a vehicle as claimed in claim 1 wherein said shielding elements are selectively extensible beyond the sides of said vehicle to shade said sides.

4. An attachment for a vehicle as claimed in claim 1 wherein yieldable fasteners hold said shielding elements in position relative to said supports, whereby said attachment can withstand expansion and contraction.

5. An attachment for a vehicle as claimed in claim 1 wherein said supports extend longitudinally of said vehicle and wherein said supports are curved to be complementary to the upper part of said vehicle.

6. An attachment for a vehicle as claimed in claim 1 wherein a plurality of links extend between and connect said shielding elements while permitting said shielding elements to be spaced apart longitudinally of said supports, said links being movable relative to said shielding elements.

7. An attachment for a vehicle as claimed in claim 1 wherein a plurality of links extend between and connect said shielding elements while permitting said shielding elements to be spaced apart longitudinally of said supports, said shielding elements being tubes and said links having openings therein to receive said tubes, the openings of adjacent links being in register whereby the ends of said tubes extend through registered openings of said links and maintain said links and tubes in assembled relation.

8. An attachment for a vehicle that comprises a plurality of brackets that have the inner ends thereof securable to said vehicle adjacent the top thereof, a plurality of elongated elements supported by said brackets adjacent the outer ends of said brackets, said inner ends of said brackets defining a surface complementary to the top of said vehicle, said brackets holding said elements above said surface to provide an air space between said elements and said surface, said elements being tubes, said tubes carrying within them readily telescoping tubes that can be extended to shade the sides of said vehicle.

9. An attachment for a vehicle that comprises a plurality of brackets that have the inner ends thereof securable to said vehicle adjacent the top thereof, a plurality of elongated elements supported by said brackets adjacent the outer ends of said brackets, said inner ends of said brackets defining a surface complementary to the top of said vehicle, said brackets holding said elements above said surface to provide an air space between said elements and said surface, and spacers holding said elements in laterally spaced relation, said spacers having openings therein which telescope over said elements and which permit rotative movement of said spacers relative to said elements.

10. An attachment for a vehicle that comprises a plurality of brackets that have the inner ends thereof securable to said vehicle adjacent the top thereof, a plurality of elongated elements supported by said brackets adjacent the outer ends of said brackets, said inner ends of said brackets defining a surface complementary to the top of said vehicle, said brackets holding said elements above said surface to provide an air space between said elements and said surface, said brackets including curved rods that are spaced apart and underlie and support said elements, and spacers that have openings therethrough to telescope over said elements, said spacers being positioned inwardly of said curved rods of said brackets.

11. An attachment for a vehicle that comprises a plurality of brackets that have the inner ends thereof securable to said vehicle adjacent the top thereof, a plurality of elongated elements supported by said brackets adjacent the outer ends of said brackets, said inner ends of said brackets defining a surface complementary to the top of said vehicle, said brackets holding said elements above said surface to provide an air space between said elements and said surface, said brackets including curved rods that are spaced apart and underlie and support said elements, and fasteners that releasably secure said elements to said brackets, said fasteners being biased to hold said elements against said curved rods but being yieldable to permit expansion and contraction of said curved rods.

12. An attachment for a vehicle that comprises a plurality of brackets that have the inner ends thereof securable to said vehicle adjacent the top thereof, a plurality of elongated elements supported by said brackets adjacent the outer ends of said brackets, said inner ends of said brackets defining a surface complementary to the top of said vehicle, said brackets holding said elements above said surface to provide air space between said elements and said surface, said elements being spaced laterally apart to permit hot air to escape while substantially shading said surface, said brackets having awning-receiving portions spaced above said surface but below said elements to support one end of an awning above said surface and thereby provide an air gap between said one end of said awning and said surface, the spacing of said portions above said surface but below said elements permitting heated air below said awning to rise upwardly and pass between said one end of said awning and said surface and under said elements.

13. An attachment for a vehicle that comprises a plurality of brackets that have the inner ends thereof securable to said vehicle adjacent the top thereof, a plurality of elongated elements supported by said brackets adjacent the outer ends of said brackets, said inner ends of said brackets defining a surface complementary to the top of said vehicle, said brackets holding said elements above said surface to provide an air space between said elements and said surface, said brackets having awning-receiving portions adjacent said surface to selectively support one end of an awning, said brackets having a second set of awning-receiving portions spaced above said surface to selectively support the said one end of said awning above said surface and thereby provide an air gap between said one end of said awning and said surface, the securement of said one end of said awning to said second set of portions permitting heated air below said awning to rise upwardly and pass between said one end of said awning and said surface, the securement of said one end of said awning to the first of said portions entrapping heated air under said awning.

References Cited in the file of this patent

UNITED STATES PATENTS

| Number | Name | Date |
| --- | --- | --- |
| 656,033 | Miller | Aug. 14, 1900 |
| 1,530,540 | Bouffier | Mar. 24, 1925 |
| 2,306,537 | Hamm | Dec. 29, 1942 |
| 2,496,085 | Engelheart | Jan. 31, 1950 |
| 2,508,757 | Gray | May 23, 1950 |
| 2,546,099 | Jamison | Mar. 20, 1951 |
| 2,602,406 | Orter | July 8, 1952 |